(12) United States Patent
Morozumi et al.

(10) Patent No.: US 10,840,520 B2
(45) Date of Patent: Nov. 17, 2020

(54) METHOD FOR MANUFACTURING FUEL CELL STACK AND FUEL CELL STACK

(71) Applicant: TOYOTA SHATAI KABUSHIKI KAISHA, Kariya (JP)

(72) Inventors: Eiichiro Morozumi, Kariya (JP); Michi Hashiba, Kariya (JP)

(73) Assignee: TOYOTA SHATAI KABUSHIKI KAISHA, Kariya (JP)

( * ) Notice: Subject to any disclaimer, the term of this patent is extended or adjusted under 35 U.S.C. 154(b) by 106 days.

(21) Appl. No.: 16/243,429

(22) Filed: Jan. 9, 2019

(65) Prior Publication Data
US 2019/0229354 A1 Jul. 25, 2019

(30) Foreign Application Priority Data
Jan. 19, 2018 (JP) .................. 2018-007261

(51) Int. Cl.
*H01M 8/04007* (2016.01)
*H01M 8/0228* (2016.01)
(Continued)

(52) U.S. Cl.
CPC ..... *H01M 8/04074* (2013.01); *H01M 8/0206* (2013.01); *H01M 8/0221* (2013.01); *H01M 8/0228* (2013.01); *H01M 8/0258* (2013.01); *H01M 8/04029* (2013.01); *H01M 8/2404* (2016.02)

(58) Field of Classification Search
CPC ....... H01M 8/0228; H01M 2008/1095; H01M 8/021; H01M 8/0206; H01M 8/0221; H01M 8/0239; H01M 8/0258; H01M 8/2404; H01M 8/0245; H01M 8/0247; H01M 8/0273; H01M 8/241; H01M 8/242;
(Continued)

(56) References Cited

U.S. PATENT DOCUMENTS

| 3,940,285 A | * | 2/1976 | Nickols, Jr. ....... | H01M 8/04029 429/434 |
| 2005/0106444 A1 | * | 5/2005 | Yamauchi ........... | H01M 8/0267 429/434 |

(Continued)

FOREIGN PATENT DOCUMENTS

JP 2007-242576 A 9/2007

OTHER PUBLICATIONS

European Search Report issued in corresponding application No. 19151030.4, dated Apr. 14, 2019.

*Primary Examiner* — Carlos Barcena
(74) *Attorney, Agent, or Firm* — Maschoff Brennan (57) ABSTRACT

A fuel cell stack includes a plurality of power generation cells stacked and connected in series and coolant passages configured to circulate coolant. The power generation cells each include a membrane electrode assembly and two separators sandwiching the membrane electrode assembly. The separators are each formed by a metal plate. The coolant passages include through-holes extending through the separators and aligned in a stacking direction of the power generation cells. A method for manufacturing a fuel cell stack includes forming a coating of electrodeposition paint on surfaces of ones of the separators having a high electric potential in the fuel cell stack by operating the fuel cell stack and using the coolant that contains electrodeposition paint particles.

3 Claims, 5 Drawing Sheets

(51) Int. Cl.
*H01M 8/2404* (2016.01)
*H01M 8/0258* (2016.01)
*H01M 8/0206* (2016.01)
*H01M 8/04029* (2016.01)
*H01M 8/0221* (2016.01)

(58) Field of Classification Search
CPC ............ H01M 8/2457; H01M 8/2483; H01M 8/04029; H01M 8/04074
See application file for complete search history.

(56) References Cited

U.S. PATENT DOCUMENTS

| 2009/0297921 | A1 | 12/2009 | Watanabe et al. | |
|---|---|---|---|---|
| 2010/0227246 | A1* | 9/2010 | Iizuka | H01M 8/0273 429/479 |
| 2010/0233584 | A1 | 9/2010 | Watanabe et al. | |

* cited by examiner

METHOD FOR MANUFACTURING FUEL CELL STACK AND FUEL CELL STACK

BACKGROUND

The present invention relates to a fuel cell stack and a method for manufacturing the fuel cell stack that includes a coolant passage through which a coolant is circulated.

A power generation cell of a polymer electrolyte fuel cell includes a membrane electrode assembly (i.e., MEA) and two separators sandwiching the membrane electrode assembly. The separators are each formed by a metal plate. The membrane electrode assembly includes an electrolyte membrane formed by an ion-exchange membrane and two electrodes sandwiching the electrolyte membrane. In the power generation cell, fuel gas (such as a hydrogen gas) is supplied to a gas passage extending between one separator and the membrane electrode assembly, and an oxidant gas (such as air) is supplied to a gas passage extending between the other separator and the membrane electrode assembly. A fuel cell stack has a structure in which power generation cells are stacked and connected in series.

The fuel cell stack is cooled so that the temperature of the fuel cell stack does not become excessively high. The fuel cell stack includes a coolant passage (inter-cell passage) defined between adjacent ones of the power generation cells, that is, between a separator of one power generation cell and a separator of another power generation cell. Further, two passages (coolant intake passage and coolant discharge passage) extend inside the fuel cell stack through the separators of each power generation cell in the stacking direction of the power generation cells. Inter-cell passages are connected in parallel between the coolant intake passage and the coolant discharge passage. The fuel cell stack includes a coolant supply device serving as a peripheral device. The coolant supply device supplies coolant to the coolant intake passage and recovers the coolant from the coolant discharge passage. When the coolant supply device actuates and sends the coolant into the fuel cell stack (coolant intake passage, coolant discharge passage, and inter-cell passages), the fuel cell stack is cooled through heat exchange between the coolant and the fuel cell stack.

When actuated, the fuel cell stack generates a difference in electric potential between the separator at one side of each power generation cell (anode output terminal side of fuel cell stack) and the separator at the other side of the power generation cell (cathode output terminal side of the fuel cell stack) in the stacking direction. The coolant intake passage and the coolant discharge passage are formed to extend through the separators in the stacking direction. Thus, the electric potential difference and the coolant flowing through the coolant intake passage (or coolant discharge passage) may cause electric corrosion (i.e., electrolytic corrosion) of the separators.

Electrolytic corrosion can be prevented by applying an insulative coating to the surfaces of the separators of each power generation cell. However, each separator is formed by a metal plate and configures part of a power generation circuit (specifically, a portion connecting adjacent power generation cells) in the fuel cell stack. Thus, if the surfaces of the separators are entirely coated, the fuel cell stack cannot function to generate power. Japanese Laid-Open Patent Publication No. 2007-242576 discloses partial masking of the separators when coating the surfaces of the separators. This will avoid the formation of coating at portions that need not be coated (portions connecting adjacent power generation cells).

SUMMARY

In this case, when manufacturing the fuel cell stack, after forming the coating on the masked surfaces of the separators, it is necessary to perform complicated work of removing the masking from each separator of the power generation cells. This will lower the productivity of a fuel cell stack.

It is an object of the present invention to provide a fuel cell stack and a method for manufacturing the fuel cell stack that improves productivity.

In order to achieve the object, in a method for manufacturing a fuel cell stack, the fuel cell stack includes a plurality of power generation cells stacked and connected in series, wherein the power generation cells each include a membrane electrode assembly and two separators sandwiching the membrane electrode assembly, and the separators are each formed by a metal plate, and coolant passages configured to circulate coolant, wherein the coolant passages include through-holes extending through the separators and aligned in a stacking direction of the power generation cells. The method includes forming a coating of electrodeposition paint on surfaces of ones of the separators having a high electric potential in the fuel cell stack by operating the fuel cell stack and using the coolant that contains electrodeposition paint particles.

In order to achieve the object, a fuel cell stack may include a plurality of power generation cells stacked and connected in series, wherein the power generation cells each include a membrane electrode assembly and two separators sandwiching the membrane electrode assembly, and the separators are each formed by a metal plate; coolant passages configured to circulate coolant, wherein the coolant passages include through-holes extending through the separators and aligned in a stacking direction of the power generation cells; and a coating of electrodeposition paint formed on surfaces of ones of the separators having a high electric potential in the fuel cell stack by operating the fuel cell stack and using the coolant that contains electrodeposition paint particles.

In order to achieve the object, a fuel cell stack may include a plurality of power generation cells stacked and connected in series, wherein the power generation cells each include a membrane electrode assembly and two separators sandwiching the membrane electrode assembly, and the separators are each formed by a metal plate; and coolant passages configured to circulate coolant, wherein the coolant passages include through-holes extending through the separators and aligned in a stacking direction of the power generation cells, wherein the coolant contains electrodeposition paint particles.

Other aspects and advantages of the embodiments will become apparent from the following description, taken in conjunction with the accompanying drawings, illustrating by way of example the principles of the invention.

BRIEF DESCRIPTION OF THE DRAWINGS

The embodiments, together with objects and advantages thereof, may best be understood by reference to the following description of the presently preferred embodiments together with the accompanying drawings in which.

DETAILED DESCRIPTION

A fuel cell stack and a method for manufacturing the fuel cell stack according to one embodiment will now be described.

Figure 1:
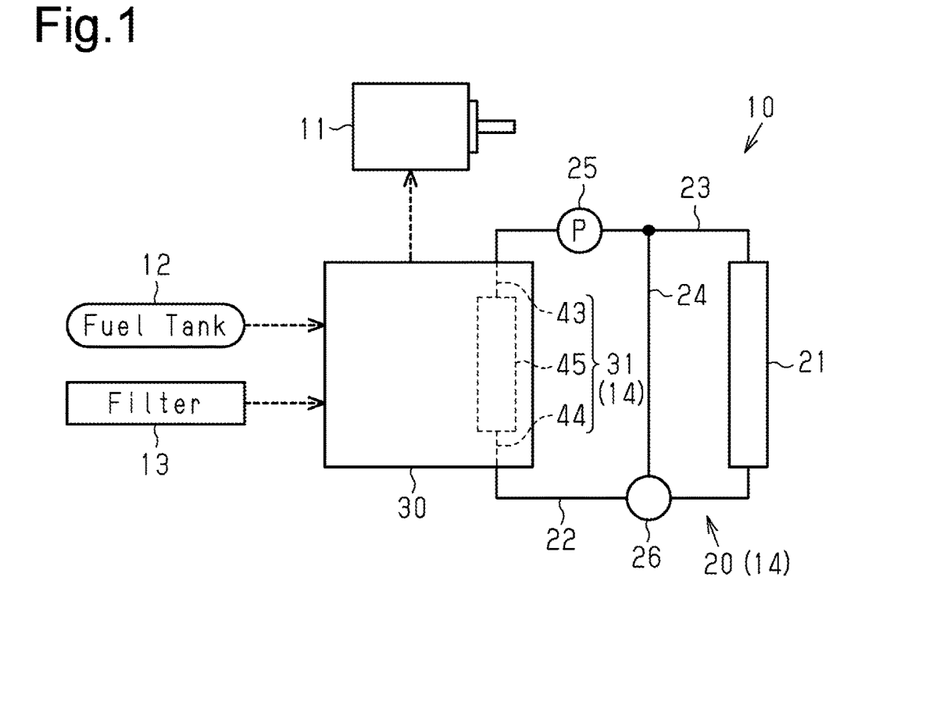
FIG. 1 is a schematic diagram showing the structure of a vehicle on which a fuel cell stack according to one embodiment is mounted.

As shown in FIG. 1, an electric motor 11, serving as a driving source, and a fuel cell stack 30, supplying power to the electric motor 11, are mounted on a vehicle 10. The fuel cell stack 30 includes a plurality of power generation cells of a polymer electrolyte fuel cell. The power generation cells are stacked and connected in series. The present embodiment includes four hundred power generation cells. The vehicle 10 includes a fuel tank 12 filled with fuel (hydrogen in the present embodiment) and a filter 13 that filters air. The fuel cell stack 30, specifically, each power generation cell, is supplied with fuel gas (hydrogen gas) from the fuel tank 12 and oxidant gas (air) through the filter 13. The fuel cell stack 30 generates power using the fuel gas and the oxidant gas.

The vehicle 10 includes a cell cooling system 14 that cools the fuel cell stack 30. The cell cooling system 14 includes an internal coolant passage 31 and a coolant supply-discharge device 20. The internal coolant passage 31 (coolant intake passage 43, coolant discharge passage 44, and inter-cell passages 45) are defined inside the fuel cell stack 30 to circulate coolant. The coolant supply-discharge device 20 supplies and discharges a coolant to and from the internal coolant passage 31.

The coolant supply-discharge device 20 includes a radiator 21, external coolant passages 22 and 23, a bypass coolant passage 24, a coolant pump 25, and a thermostat valve 26. The radiator 21 is a heat exchanger that cools the coolant flowing through the radiator 21 by exchanging heat with the ambient air. The external coolant passage 22 guides the coolant flowing out of the internal coolant passage 31 (coolant discharge passage 44) to the radiator 21. The external coolant passage 23 returns the coolant flowing through the radiator 21 to the internal coolant passage 31 (coolant intake passage 43). The bypass coolant passage 24 connects the external coolant passage 22 to the external coolant passage 23 to bypass the radiator 21. The coolant pump 25 is arranged in the external coolant passage 23. The coolant pump 25 is actuated to forcibly circulate the coolant inside the cell cooling system 14. The thermostat valve 26 is a three-way valve that changes its open degree in accordance with the temperature of the coolant that comes in contact with the thermostat valve 26. The thermostat valve 26 is arranged in a portion where the external coolant passage 22 and the bypass coolant passage 24 are connected. The cross-sectional areas of the external coolant passage 22 and the bypass coolant passage 24 are changed as the open degree of the thermostat valve 26 changes to adjust the amount of coolant flowing into the radiator 21. In the present embodiment, the thermostat valve 26 functions to automatically regulate the temperature of the coolant at a predetermined temperature (85 degrees Celsius in the present embodiment).

The structure of the fuel cell stack 30 will now be described in detail.

Figure 2:
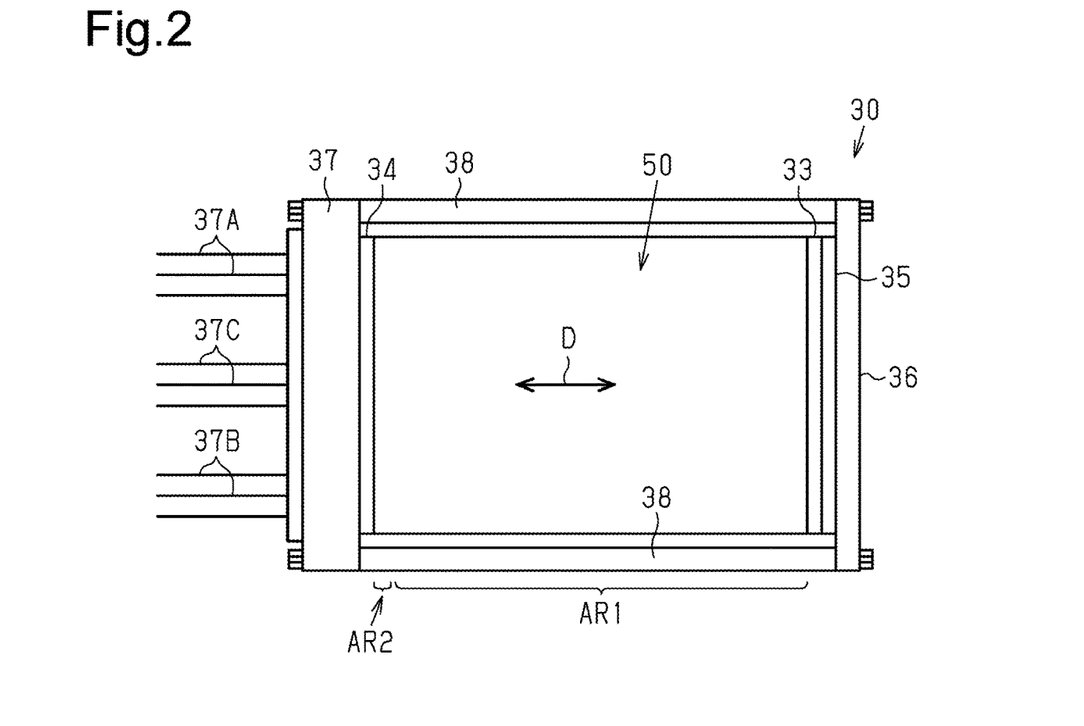
FIG. 2 is a side view of the fuel cell stack.

As shown in FIG. 2, a plurality of power generation cells 50 are stacked and connected in series inside the fuel cell stack 30. The fuel cell stack 30 includes two terminal plates arranged to sandwich the power generation cells 50 in a stacking direction D. The two terminal plates include an anode terminal plate 33 and a cathode terminal plate 34.

The anode terminal plate 33 includes an anode output terminal (not shown) of the fuel cell stack 30. An insulator 35 made of an insulating material and a pressure plate 36 are attached to cover an outer surface (right surface in FIG. 2) of the anode terminal plate 33 in the stacking direction D.

The cathode terminal plate 34 includes a cathode output terminal (not shown) of the fuel cell stack 30. A stack manifold 37 is attached to cover an outer surface (left surface in FIG. 2) of the cathode terminal plate 34 in the stacking direction D. The stack manifold 37 is connected to fuel gas pipes 37A, which supply and discharge fuel gas, oxidant gas pipes 37B, which supply and discharge oxidant gas (i.e., air), and coolant pipes 37C, which supply and discharge coolant. The stack manifold 37 supplies and discharges the fuel gas to and from the fuel cell stack 30, the oxidant gas to and from the fuel cell stack 30, and the coolant to and from the internal coolant passage 31.

The fuel cell stack 30 includes two connection plates 38 sandwiching the power generation cells 50 in a direction (vertical direction in FIG. 2) that is orthogonal to the stacking direction D. The two connection plates 38 extend along the outer surfaces of the power generation cells 50. Each connection plate 38 has one end (right end in FIG. 2) fastened by bolts to the pressure plate 36 and another end (left end in FIG. 2) fastened by bolts to the stack manifold 37. Thus, the fuel cell stack 30 has a structure that holds the power generation cells 50, the terminal plates 33 and 34, and the insulator 35 between the pressure plate 36 and the stack manifold 37.

The structure of the power generation cell 50 will now be described in detail.

Figure 3:
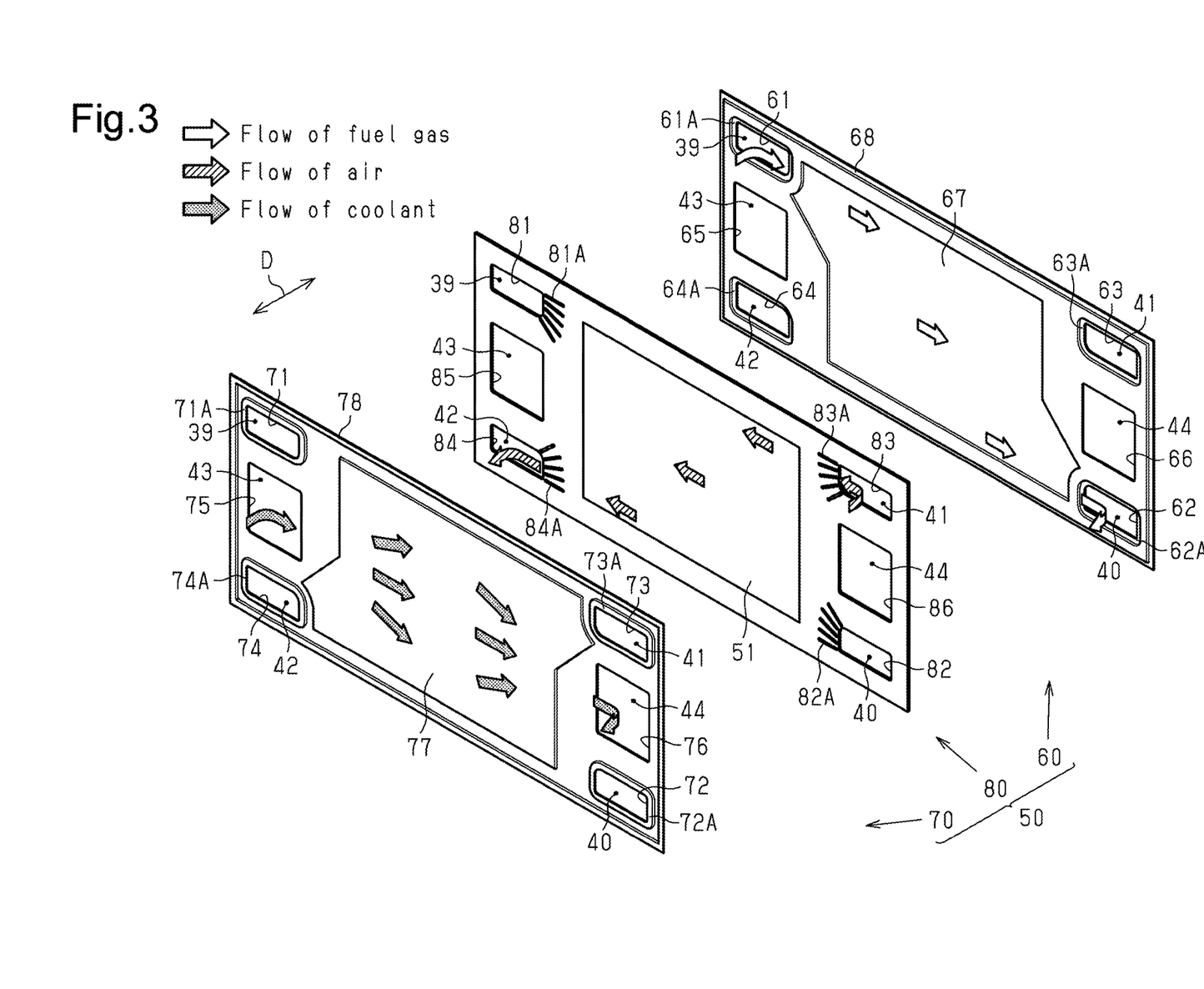
FIG. 3 is an exploded perspective view of a power generation cell.

As shown in FIG. 3, each power generation cell 50 includes a membrane electrode assembly 51. The membrane electrode assembly 51 has a five-layer structure including an electrolyte membrane serving as a polymer electrolyte, two electrodes sandwiching the electrolyte membrane, and two gas diffusion layers formed by carbon sheets sandwiching the electrolyte membrane and the electrodes. The power generation cell 50 includes an upstream separator 60, a downstream separator 70, and a flat frame plate 80 sandwiched by the separators 60 and 70. The frame plate 80 includes a central portion formed by the membrane electrode assembly 51 and other portions formed by an insulator.

Figure 4:
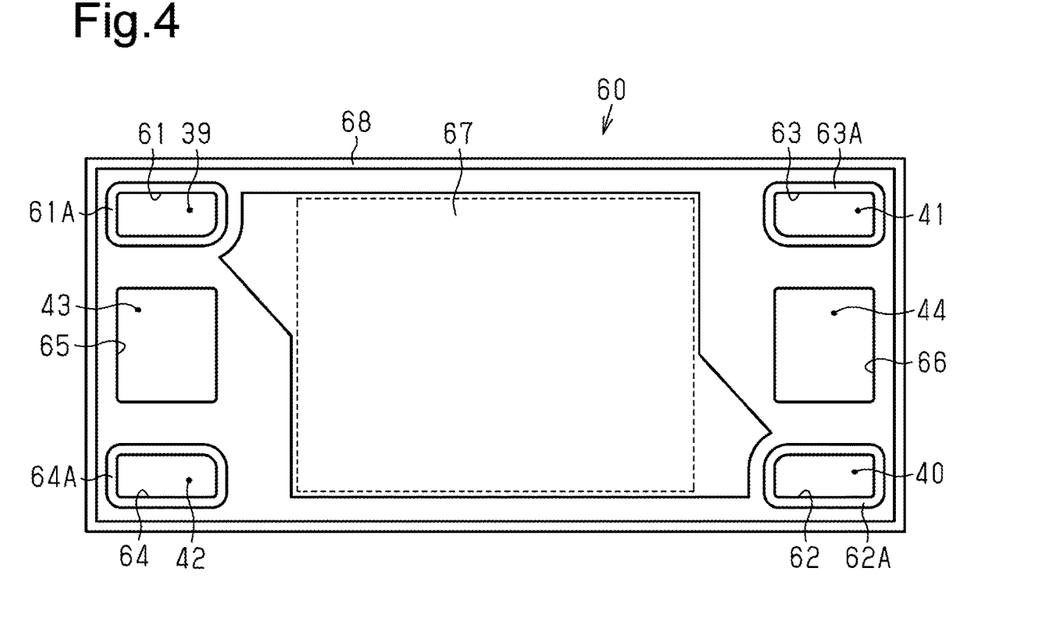
FIG. 4 is a plan view of an upstream separator.

As shown in FIGS. 3 and 4, the upstream separator 60 is formed by pressing a sheet of metal (stainless steel) and thereby adding recesses and projections. These recesses and projections function to define a passage that allows fuel gas to flow inside the power generation cell 50 and function to define a passage (inter-cell passage 45 in FIG. 1) that allows coolant to be circulated between adjacent power generation cells 50. In the present embodiment, the size of the upstream separator 60 is approximately 0.06 square meters in a plan view. FIG. 4 shows the surface of the upstream separator 60 facing the frame plate 80 (see FIG. 3).

The upstream separator 60 includes through-holes 61 to 66. The through-hole 61 is located in an upper part (upper left corner in FIG. 4) of a first edge in the longitudinal direction (right-left direction in FIG. 4) of the upstream separator 60. The through-hole 61 forms a part of a fuel gas intake passage 39 that circulates and sends fuel gas into each power generation cell 50. The through-hole 62 is located in a lower part (lower right corner in FIG. 4) of a second edge in the longitudinal direction of the upstream separator 60. The through-hole 62 forms a part of a fuel gas discharge passage 40 that discharges the fuel gas from each power generation cell 50. The through-hole 63 is located in an upper part (upper right corner in FIG. 4) of the second edge in the longitudinal direction of the upstream separator 60. The through-hole 63 forms a part of an air intake passage 41 that circulates and sends air serving as an oxidant gas into each power generation cell 50. The through-hole 64 is located in a lower part (lower left corner in FIG. 4) of the first edge in the longitudinal direction of the upstream separator 60. The through-hole 64 forms a part of an air discharge passage 42 that discharges the air from each power generation cell 50. The through-hole 65 is located in the first edge in the longitudinal direction of the upstream separator 60. The through-hole 65 forms a part of the coolant intake passage 43 (coolant passage) that circulates and sends a coolant to each inter-cell passage 45. The through-hole 66 is located in the second edge in the longitudinal direction of the upstream separator 60. The through-hole 66 forms a part of the coolant discharge passage 44 (coolant passage) that merges and discharges the coolant flowing through the inter-cell passages 45. The edges of the through-holes 61 to 64 include recesses 61A to 64A recessed away from the frame plate 80 (toward side that is not shown in FIG. 4). The through-holes 61 to 64 each open at the bottom of the corresponding one of the recesses 61A to 64A. The outer edge of the upstream separator 60 includes a recess 68 recessed away from the frame plate 80.

A central portion of the upstream separator 60 in the longitudinal direction includes a recess 67 recessed away from the frame plate 80. The recess 67 is formed in a range including portions adjacent to the membrane electrode assembly (shown by broken lines in FIG. 4). The upstream separator 60 and the frame plate 80 are in contact inside the power generation cell 50 (FIG. 3). Thus, the recess 67 defines open space that forms a part of a passage through which the fuel gas flows between the upstream separator 60 and the frame plate 80. The bottom wall of the recess 67 includes recesses and projections (not shown).

Figure 5:
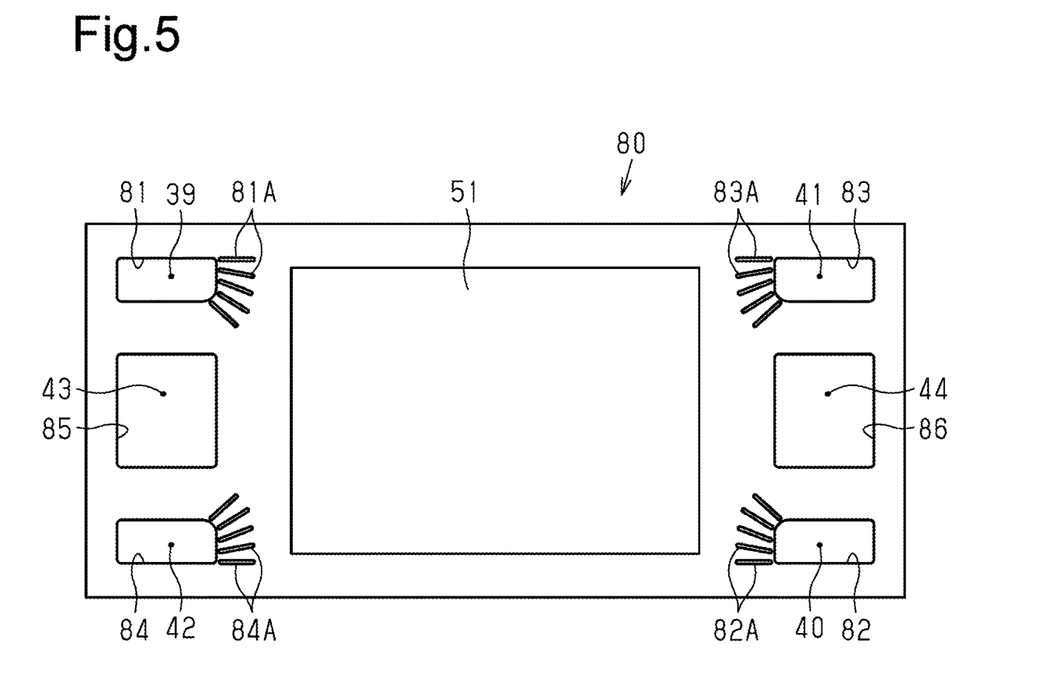
FIG. 5 is a plan view of a frame plate.

As shown in FIGS. 3 and 5, the frame plate 80 includes through-holes 81 to 86. The through-holes 81 to 86 are located at positions that correspond to the through-holes 61 to 66 of the upstream separator 60 and form parts of corresponding fluid passages (fuel gas intake passage 39, fuel gas discharge passage 40, air intake passage 41, air discharge passage 42, coolant intake passage 43, and coolant discharge passage 44). The frame plate 80 and the upstream separator 60 (FIG. 3) are in contact at the edges of the through-holes 81 to 86 inside the power generation cell 50. This seals the fuel gas intake passage 39, the fuel gas discharge passage 40, the air intake passage 41, the air discharge passage 42, the coolant intake passage 43, and the coolant discharge passage 44 against the outside between the opposing surfaces of the frame plate 80 and the upstream separator 60.

As shown in FIGS. 3 and 5, the frame plate 80 includes a plurality of elongated holes 81A extending from positions adjacent to the through-hole 61 (i.e., recess 61A) of the upstream separator 60 to positions adjacent to the recess 67. Specifically, five elongated holes 81A are formed in the frame plate 80 of the present embodiment. The elongated holes 81A are slits that connect the fuel gas intake passage 39 (i.e., the through-hole 61) to the inside of the recess 67 between the upstream separator 60 and the downstream separator 70 (see FIG. 1).

Further, the frame plate 80 includes a plurality of elongated holes 82A extending from positions adjacent to the through-hole 62 (i.e., recess 62A) of the upstream separator 60 to positions adjacent to the recess 67. Specifically, five elongated holes 82A are formed in the frame plate 80 of the present embodiment. The elongated holes 82A are slits that connect the fuel gas discharge passage 40 (i.e., the through-hole 62) to the inside of the recess 67 between the upstream separator 60 and the downstream separator 70.

As shown by the blank arrows in FIG. 3, the fuel gas flows in order of "the fuel gas intake passage 39, the elongated holes 81A, the inside of the recess 67, the elongated holes 82A, and the fuel gas discharge passage 40" inside the fuel cell stack 30.

Since the structure of the downstream separator 70 is basically the same as the upstream separator 60, the structure of the downstream separator 70 will not be described in detail. In FIG. 3, the surface of the downstream separator 70 facing the frame plate 80 is not shown.

The downstream separator 70 functions to define a passage that allows air to flow inside the power generation cell 50 and functions to define the inter-cell passage 45.

The downstream separator 70 includes through-holes 71 to 76. The through-hole 71 is located in an upper part (upper left corner in FIG. 3) of a first edge in the longitudinal direction of the downstream separator 70. The through-hole 71 forms a part of the fuel gas intake passage 39. The through-hole 72 is located in a lower part (lower right corner in FIG. 3) of a second edge in the longitudinal direction of the downstream separator 70. The through-hole 72 forms a part of the fuel gas discharge passage 40. The through-hole 73 is located in an upper part (upper right corner in FIG. 3) of the second edge in the longitudinal direction of the downstream separator 70. The through-hole 73 forms a part of the air intake passage 41. The through-hole 74 is located in a lower part (lower left corner in FIG. 3) of the first edge in the longitudinal direction of the downstream separator 70. The through-hole 74 forms a part of the air discharge passage 42. The through-hole 75 is located in the first edge in the longitudinal direction of the downstream separator 70. The through-hole 75 forms a part of the coolant intake passage 43. The through-hole 76 is located in the second edge in the longitudinal direction of the downstream separator 70. The through-hole 76 forms a part of the coolant discharge passage 44.

The edges of the through-holes 71 to 74 include recesses 71A to 74A recessed away from the frame plate 80. The through-holes 71 to 74 each open at the bottom of the corresponding one of the recesses 71A to 74A. The outer edge of the downstream separator 70 includes a recess 78 recessed away from the frame plate 80.

A recess 77 is formed in a range at the central portion of the downstream separator 70 in the longitudinal direction including portions adjacent to the membrane electrode assembly 51 (see the broken lines in FIG. 4). The downstream separator 70 and the frame plate 80 are in contact inside the power generation cell 50. Thus, the recess 77 defines open space that forms a part of a passage through which the air flows between the downstream separator 70 and the frame plate 80.

The frame plate 80 and the downstream separator 70 are in contact at the edges of the through-holes 81 to 86 of the frame plate 80 inside the power generation cell 50. This seals the fuel gas intake passage 39, the fuel gas discharge passage 40, the air intake passage 41, the air discharge passage 42, the coolant intake passage 43, and the coolant discharge passage 44 against the outside between the opposing surfaces of the frame plate 80 and the downstream separator 70.

As shown in FIGS. 3 and 5, the frame plate 80 includes a plurality of elongated holes 83A extending from positions adjacent to the through-hole 73 (i.e., recess 73A) of the downstream separator 70 to positions adjacent to the recess 77. Specifically, five elongated holes 83A are formed in the frame plate 80 of the present embodiment. The elongated holes 83A are slits that connect the air intake passage 41 (i.e., the through-hole 73) to the inside of the recess 77 between the upstream separator 60 and the downstream separator 70.

Further, the frame plate 80 includes a plurality of elongated holes 84A extending from positions adjacent to the through-hole 74 (i.e., recess 74A) of the downstream separator 70 to positions adjacent to the recess 77. Specifically, five elongated holes 84A are formed in the frame plate 80 of the present embodiment. The elongated holes 84A are slits that connect the air discharge passage 42 (i.e., the through-hole 74) to the inside of the recess 77 between the upstream separator 60 and the downstream separator 70.

As shown by the hatched arrows in FIG. 3, the air flows in order of "the air intake passage 41, the elongated holes 83A, the inside of the recess 77, the elongated holes 84A, and the air discharge passage 42" inside the fuel cell stack 30.

Figure 6:
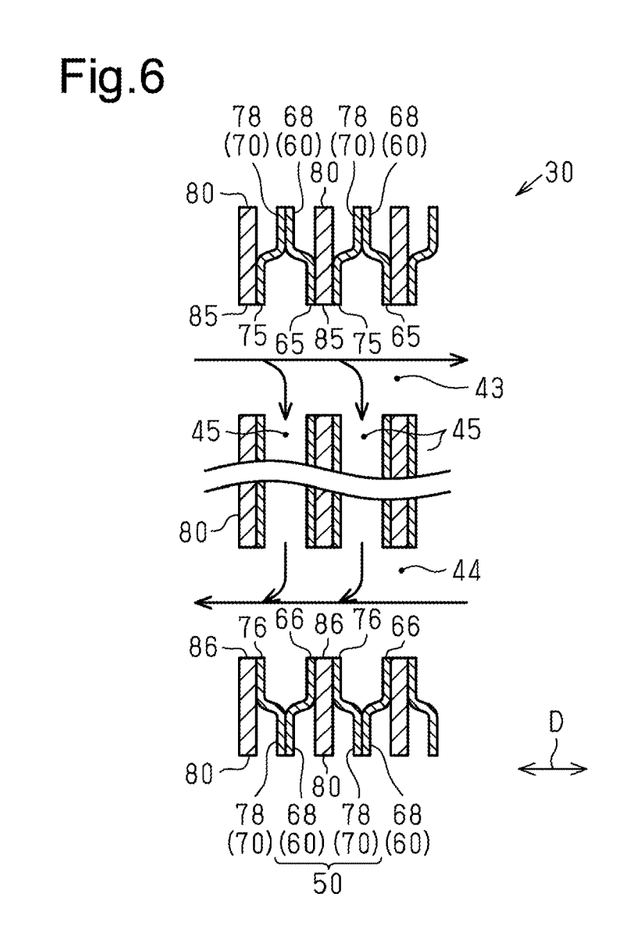
FIG. 6 is a schematic cross-sectional view showing the structure of an internal coolant passage.

As schematically shown in FIG. 6, the fuel cell stack 30 is a stack of the power generation cells 50. The inter-cell passages 45 extend between adjacent power generation cells 50 inside the fuel cell stack 30.

Specifically, in a state in which the fuel cell stack 30 is assembled, the outer edge of the upstream separator 60 (i.e., bottom wall of recess 68) in one of two adjacent power generation cells 50 is in contact with the outer edge of the downstream separator 70 (i.e., the bottom wall of the recess 78) in the other one of the power generation cells 50. Thus, the inter-cell passage 45 is defined by the outer surface of the upstream separator 60 in one power generation cell 50 and the outer surface of the downstream separator 70 in the other power generation cell 50.

Further, the edges of the through-holes 65 and 66 of the upstream separator 60 and the edges of the through-holes 75 and 76 of the downstream separator 70 do not include a recess recessed away from the frame plate 80. Thus, the outer surfaces of the adjacent separators 60 and 70 are spaced apart from each other at the edges of the through-holes 65 and 66 and the through-holes 75 and 76. Further, the through-holes 65 and 66 of the upstream separator 60 and the through-holes 75 and 76 of the downstream separator 70 are open to (in communication with) the inter-cell passage 45 between the separators 60 and 70. In this manner, the inter-cell passage 45 is in communication with the coolant intake passage 43 (through-holes 65 and 75) and the coolant discharge passage 44 (through-holes 66 and 76).

In the state in which the fuel cell stack 30 is assembled, the entire edge of each of the through-holes 61 to (i.e., bottom wall of each of recesses 61A to 64A) of the upstream separator 60 in one of the two adjacent power generation cells 50 is in contact with the entire edge of the corresponding one of the through-holes 71 to 74 (i.e., bottom wall of corresponding one of recesses 71A to 74A) of the downstream separator 70 in the other power generation cell 50. Thus, the through-holes 61 to 64 of the upstream separator 60 and the through-holes 71 to 74 of the adjacent downstream separator 70 are not open to (in communication with) the inter-cell passage 45 between the separators 60 and 70.

As shown by the shaded arrows in FIG. 3 and by the arrows in FIG. 6, the coolant flows in order of "the coolant intake passage 43, the inter-cell passage 45 between the separators 60 and 70, and the coolant discharge passage 44" inside the fuel cell stack 30.

When the vehicle 10 is assembled, the cell cooling system 14 is filled with coolant after the fuel cell stack 30 and the coolant supply-discharge device 20 are mounted on the vehicle 10.

In the present embodiment, the coolant supplied to the inside of the cell cooling system 14 contains ethylene glycol as a main component and includes electrodeposition paint particles. Specifically, the electrodeposition paint particles have negative charges in the coolant (i.e., anionic electrodeposition paint) and are solidified accordingly by heat (operation heat) generated by the fuel cell stack 30. The present embodiment uses the electrodeposition paint particles that are solidified at a temperature (e.g., 80 degrees Celsius) that is lower than a target temperature (85 degrees Celsius) of the coolant in the cell cooling system 14. Further, in the present embodiment, the concentration of the electrodeposition paint particles of the coolant supplied to the inside of the cell cooling system 14 is about "0.5%." Specifically, 20 liters of coolant, which is the standard supply amount for the cell cooling system 14, contain about 100 grams of electrodeposition paint particles.

The effects of the use of such a coolant will now be described.

In the present embodiment, a layer of electrodeposition paint (coating 90) is formed on the surfaces of the separators 60 and 70 by anionic electrodeposition coating processing in which the coolant is a solution of electrodeposition paint, the internal coolant passage 31 (especially the coolant intake passage 43 and the coolant discharge passage 44) is a container filled with the solution, the upstream separator 60 and the downstream separator 70 of the power generation cell 50 paired on one side in the fuel cell stack 30 serve as anodes (coated members), and the upstream separator 60 and the downstream separator 70 of the power generation cell 50 paired on the other side in the fuel cell stack 30 serve as cathodes.

Specifically, as shown in FIG. 6, the coolant intake passage 43 and the coolant discharge passage 44 (coolant passage) defined inside the fuel cell stack 30 each extend through the upstream separators 60 and the downstream separators 70 of all the power generation cells 50 to serve as a passage that extends in the stacking direction D. The coolant intake passage 43 and the coolant discharge passage 44 are filled with the coolant. Thus, the coolant intake passage 43 and the coolant discharge passage 44 functions as a container that stores a solution of electrodeposition paint for the anionic electrodeposition coating processing.

When the fuel cell stack 30 is operated, the separators 60 and 70 of the power generation cell 50 located toward the anode terminal plate 33 (see FIG. 2) in the stacking direction D have high electric potential and the separators 60 and 70 of the power generation cell 50 located toward the cathode terminal plate 34 have low electric potential. The separators 60 and 70 are exposed to the inside of the coolant intake passage 43 and the inside of the coolant discharge passage 44. Thus, the separators 60 and 70 of the power generation cell 50 located toward the anode terminal plate 33 serve as anodes (coated members) in the anionic electrodeposition coating processing, and the separators 60 and 70 of the power generation cell 50 located toward the cathode terminal plate 34 serve as cathodes in the anionic electrodeposition coating processing.

Further, the heat generated by the fuel cell stack 30 causes the temperature of the separators 60 and 70 and the temperature of the coolant to be higher than the ambient temperature. The heat generated by the fuel cell stack 30 acts as heat that solidifies the electrodeposition paint collected on the surfaces of the separators 60 and 70 in the anionic electrodeposition coating processing.

In the present embodiment, the coating 90 is formed on the surfaces of the separators 60 and 70 in the anionic electrodeposition coating processing by using the heat generated by the fuel cell stack 30 and the difference in electric potential generated between the separators 60 and 70 of the power generation cells 50 located toward the anode terminal plate 33 and the separators 60 and 70 of the power generation cells 50 located toward the cathode terminal plate 34. This forms the coating 90 on the surfaces of the separators 60 and 70 that have high electric potential when the fuel cell stack 30 is operated, that is, on the surfaces of the separators 60 and 70 that may be subjected to electrolytic corrosion just by simply operating the fuel cell stack 30 using the coolant containing the electrodeposition paint particles.

Figure 7A:
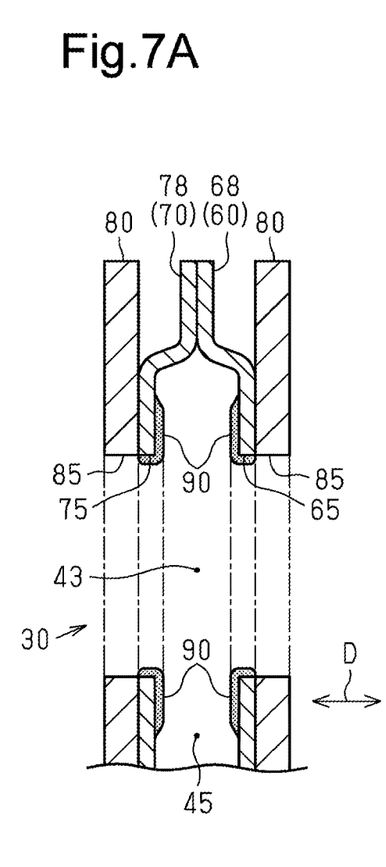
FIG. 7A is a schematic cross-sectional view showing the structure of a coolant intake passage of the fuel cell stack.
Figure 7B:
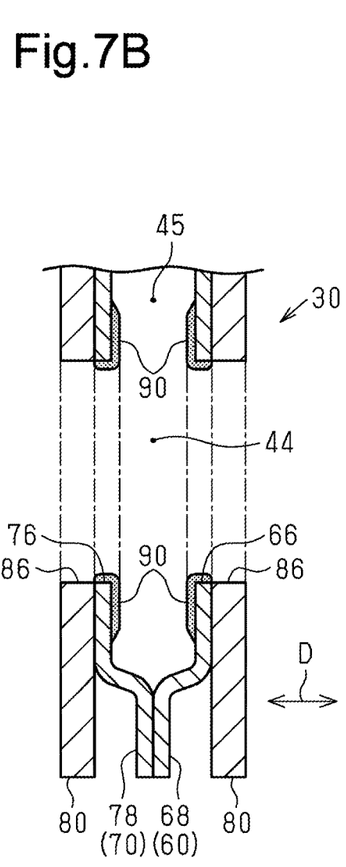
FIG. 7B is a schematic cross-sectional view showing the structure of a coolant discharge passage of the fuel cell stack.
Figure 8A:
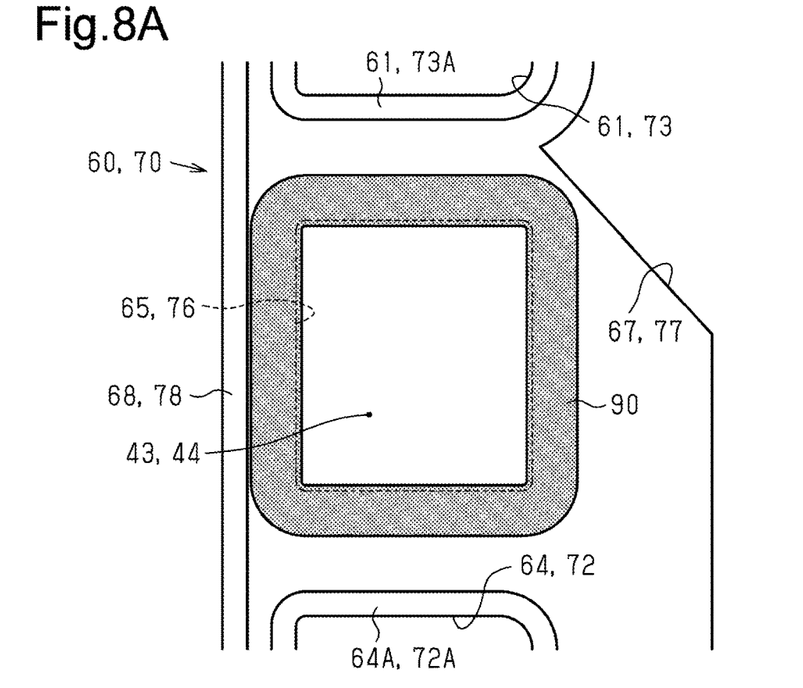
FIG. 8A is a plan view showing a through-hole of each separator.
Figure 8B:
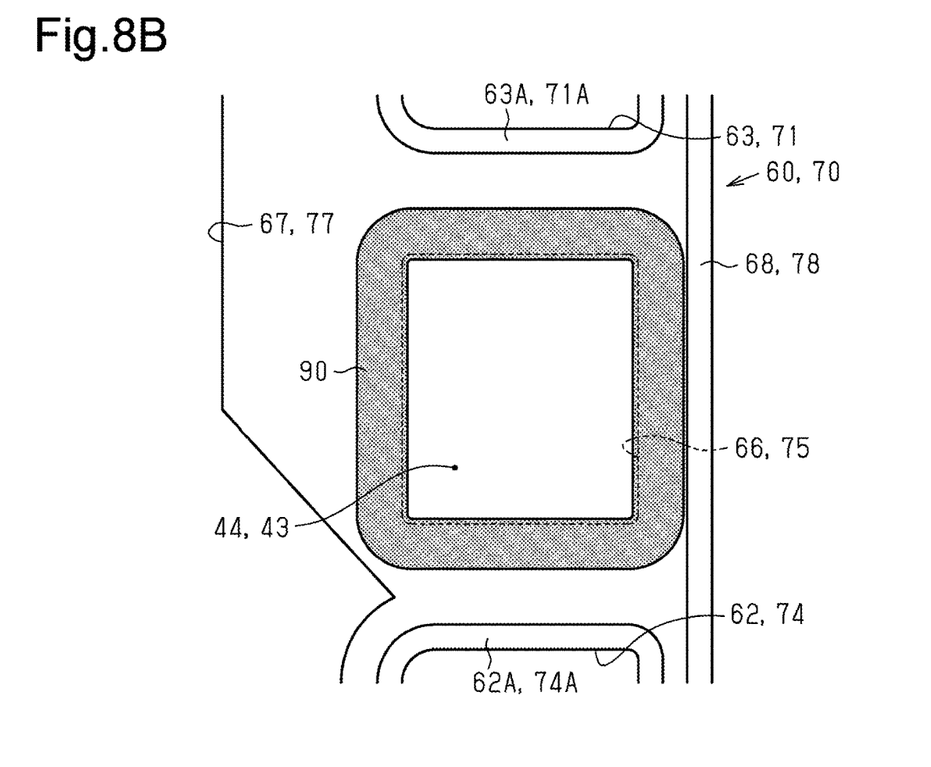
FIG. 8B is a plan view showing a through-hole of each separator.

FIGS. 7A to 8B show an example of the coating 90 formed on the surfaces of the separators 60 and 70. FIG. 7A is a schematic cross-sectional view showing the coolant intake passage 43 of the fuel cell stack 30. FIG. 7B is a schematic cross-sectional view showing the coolant discharge passage 44 of the fuel cell stack 30. Further, FIG. 8A is a plan view showing the structure of the through-hole 65 (or through-hole 75) of each separator 60 (or separator 70). FIG. 8B is a plan view showing the structure of the through-hole 66 (or through-hole 76) of each separator 60 (or separator 70). FIGS. 7A to 8B exaggerate the thickness of the coating 90 (actual thickness is several tens of micrometers in the present embodiment) to facilitate understanding.

As shown in FIGS. 7A to 8B, the coating 90 is formed in a portion of inner edges of the through-holes 65, 66, 75, and 76 of the separators 60 and 70 that is not in contact with the frame plate 80. The coating 90 is not formed in a portion of the inner edges of the through-holes 65, 66, 75, and 76 that is in contact with the frame plate 80 where the coolant substantially does not enter.

If each of the separators 60 and 70 (800 separators in total in the present embodiment) were to be individually masked for formation of the coating 90 in order to prevent electrolytic corrosion, this work consumes much time and reduces the productivity of the fuel cell stack 30.

The present embodiment does not require such time-consuming work to form the coating 90. That is, in the present embodiment, after assembling the vehicle 10 (fuel cell stack 30 and peripheral devices), the fuel cell stack 30 needs only to be operated to form the coating 90 on the surfaces of the separators 60 and 70, which are great in number, within a short period of time. This improves the productivity of the fuel cell stack 30.

The electrodeposition coating forms a coating having a thickness that is more uniform than a coating formed through spray coating. In the present embodiment, the coating 90 is formed on the surfaces of the separators 60 and 70 by electrodeposition coating. Thus, the surfaces of the separators 60 and 70 are suitably protected by a relatively thin coating 90. This reduces the amount of paint (electrodeposition paint) used to form the coating 90 as compared with a case in which the coating is formed by the spray coating.

In the present embodiment, the separators 60 and 70 located toward the anode output terminal having a relatively high electric potential when the fuel cell stack 30 is operated correspond to the separators 60 and 70 of the power generation cell 50 arranged in the range shown by "AR1" in FIG. 2. The coating 90 is formed on the separators 60 and 70 (780 separators in the present embodiment) located toward the anode output terminal because of the characteristics of anionic electrodeposition coating processing. In contrast, the separators 60 and 70 located toward the cathode output terminal having low electric potential when the fuel cell stack 30 is operated correspond to the separators 60 and 70 of the power generation cell 50 arranged in the range shown by "AR2" in FIG. 2. The coating 90 is not formed on the separators 60 and 70 (twenty separators in the present embodiment) located toward the cathode output terminal.

According to the present embodiment, the coating 90 is accurately formed on the surfaces of the separators 60 and 70, which may be subjected to electrolytic corrosion, because of high electric potential when the fuel cell stack 30 is operated. This appropriately prevents electrolytic corrosion in the fuel cell stack 30. Further, the coating 90 is not formed on the surfaces of the separators 60 and 70, which is not subjected to electrolytic corrosion, because of low electric potential when the fuel cell stack 30 is operated. Thus, the function of preventing electrolytic corrosion in the fuel cell stack 30 is provided and the amount of electrodeposition paint is reduced compared with when the coating 90 is formed on each of the separators 60 and 70 in the same manner.

The procedure for manufacturing the fuel cell stack 30 will now be described.

The upstream separator 60 and the downstream separator 70 are formed through pressing. Then, surface treatment for reducing contact resistance is performed on the inner surface of the recess 67 of the upstream separator 60 and the inner surface of the recess 77 of the downstream separator 70. The surface treatment forms a layer of a conductive material (such as carbon) on the inner surfaces of the recesses 67 and 77 of the separators 60 and 70.

Each power generation cell 50 is assembled by coupling the upstream separator 60, the downstream separator 70, and the frame plate 80, which are formed separately. The fuel cell stack 30 is assembled by coupling the power generation cells 50, the terminal plates 33 and 34, the insulator 35, the pressure plate 36, the stack manifold 37, and connection plate 38.

The fuel cell stack 30 is mounted on the vehicle 10. The internal coolant passage 31 of the fuel cell stack 30 is connected to the external coolant passages 22 and 23 of the coolant supply-discharge device 20. Then, the cell cooling system 14 is filled with coolant.

In the present embodiment, when the vehicle 10 assembled in this manner is operated, the coating 90 is formed on the surfaces of the separators 60 and 70. Specifically, when the vehicle 10 is operated, the coolant pump 25 is actuated to circulate the coolant through the coolant passage (including coolant intake passage 43 and coolant discharge passage 44) inside the cell cooling system 14. In this case, anionic electrodeposition coating processing forms a coating when electrodeposition paint particles within the coolant are collected on the surfaces of the separators 60 and 70 having high electric potential. Then, when the temperature of the fuel cell stack 30 and the temperature of the coolant inside the cell cooling system 14 are raised by heat generated by the power generation cell 50, the electrodeposition paint particles collected on the surfaces of the separators 60 and 70 are solidified into the coating 90. The coating 90 is formed on the surfaces of the separators 60 and 70 in this manner.

In the vehicle 10 of the present embodiment, after the coating 90 is formed on the surfaces of the separators 60 and 70 through the operation, the coolant inside the cell cooling system 14 will be continuously used without being replaced. Thus, in the present embodiment, the coating 90 is formed on the surfaces of the separators 60 and 70 through normal work such as operation of the vehicle 10 after the vehicle 10 is assembled, and there is no need for special work when assembling the vehicle 10.

The present embodiment has the advantages described below.

(1) The coating 90 is formed on the surfaces of the separators 60 and 70, which may be subjected to electrolytic corrosion, by simply operating the fuel cell stack 30 and employing the coolant containing the electrodeposition paint particles. This improves the productivity of the fuel cell stack 30.

Modifications

The present embodiment may be modified and implemented as follows. The present embodiment and the following modifications may be implemented in combination as long as there are no technical contradictions.

The thermostat valve 26 arranged at the connection portion of the external coolant passage 22 and the bypass coolant passage 24 in the coolant supply-discharge device 20 may be replaced with a solenoid valve. In such a structure, the operation of the solenoid may be controlled to detect the temperature of the coolant flowing inside the cell cooling system 14 and adjust the temperature to become a target temperature.

The surface treatment performed on the inner surface of the recess 67 of the upstream separator 60 and the inner surface of the recess 77 of the downstream separator 70 may be changed as long as the contact resistance of the inner surfaces is reduced. Gold plating may be used for such surface treatment. Further, if the contact resistance between the separators 60 and 70 can be reduced, such surface treatment may be omitted.

After the coating 90 is formed on the surfaces of the separators 60 and 70 by operating the vehicle 10 with the supplied coolant containing the electrodeposition paint particles, the coolant may be replaced with a coolant that does not contain electrodeposition paint particles.

Any substance may be used for the electrodeposition paint particles added to the coolant as long as it has negative charge in the coolant and is solidified accordingly by heat generated by the fuel cell stack 30. Further, the concentration of the electrodeposition paint particles in the coolant may be changed as required. In other words, the coolant only needs to contain the amount of electrodeposition paint required to form the coating 90 on the surfaces of the separators 60 and 70.

When the fuel cell stack 30 is manufactured (when coating 90 is formed), the coolant supply-discharge device 20 of the vehicle 10 does not have to be used. A coolant supply-discharge device 20 of a factory may be used. In such a case, electrodeposition paint particles that solidify at a temperature higher than the target temperature of the coolant in the cell cooling system 14 may be used. With such a structure, after the electrodeposition paint particles are collected on the surfaces of the separators 60 and 70 in anionic electrodeposition coating processing, a heater heats the coolant to raise the temperature of the coolant to a solidifying temperature or higher. This solidifies the electrodeposition paint particles collected on the surfaces of the separators 60 and 70 and forms the coating 90.

The upstream separator 60 and the downstream separator 70 may be formed from an iron alloy other than stainless steel or may be formed from aluminum, aluminum alloy, copper, or copper alloy. In this case, it is desirable that the electrodeposition paint particles added to the coolant easily collect on the surfaces of the separators 60 and 70 in correspondence with the material of the separators 60 and 70.

A fuel cell stack and a method thereof in the above embodiment are not limited to a fuel cell stack mounted on a vehicle but may be applied to a type of fuel cell stack placed on the ground.

The present examples and embodiments are to be considered as illustrative and not restrictive, and the invention is not to be limited to the details given herein, but may be modified within the scope and equivalence of the appended claims.

The invention claimed is:

1. A method for manufacturing a fuel cell stack, wherein the fuel cell stack includes:
   a plurality of power generation cells stacked and connected in series, wherein the power generation cells each include a membrane electrode assembly and two separators sandwiching the membrane electrode assembly, and the separators are each formed by a metal plate, and
   coolant passages configured to circulate coolant, wherein the coolant passages include through-holes extending through the separators and aligned in a stacking direction of the power generation cells,
   the method comprising:
   forming a coating of electrodeposition paint on surfaces of the separators having a relatively high electric potential in the fuel cell stack by operating the fuel cell stack and using the coolant that contains electrodeposition paint particles.

2. A fuel cell stack comprising:
   a plurality of power generation cells stacked and connected in series, wherein the power generation cells each include a membrane electrode assembly and two separators sandwiching the membrane electrode assembly, and the separators are each formed by a metal plate;
   coolant passages configured to circulate coolant, wherein the coolant passages include through-holes extending through the separators and aligned in a stacking direction of the power generation cells; and
   a coating of electrodeposition paint formed on surfaces of the separators having a relatively high electric potential in the fuel cell stack by operating the fuel cell stack and using the coolant that contains electrodeposition paint particles.

3. A fuel cell stack comprising:
   a plurality of power generation cells stacked and connected in series, wherein the power generation cells each include a membrane electrode assembly and two separators sandwiching the membrane electrode assembly, and the separators are each formed by a metal plate; and
   coolant passages configured to circulate coolant, wherein the coolant passages include through-holes extending through the separators and aligned in a stacking direction of the power generation cells, wherein the coolant contains electrodeposition paint particles.

* * * * *